Sept. 14, 1954 DE LOY McMULLIN 2,689,148

STROLLER WEATHER-SHIELD ATTACHMENT

Filed July 10, 1952

DeLoy McMullin
INVENTOR.

BY *Clarence A. O'Brien*
*and Harvey B. Jackson*
Attorneys

Patented Sept. 14, 1954

2,689,148

UNITED STATES PATENT OFFICE 2,689,148

STROLLER WEATHER-SHIELD ATTACHMENT

De Loy McMullin, Ogden, Utah

Application July 10, 1952, Serial No. 298,038

6 Claims. (Cl. 296—78)

This invention relates to new and useful improvements in stroller attachments and the primary object of the present invention is to provide a shielding device for strollers that will protect a child's legs in inclement weather, while also providing means preventing a child from dragging his feet.

Another important object of the present invention is to provide a lightweight shielding attachment for a baby stroller that is provided with means whereby the same may be quickly and readily attached to or removed from the conventional parts of a stroller in a convenient manner.

A further object of the present invention is to provide a stroller attachment comprising a flexible enclosure member that will cover a front portion of a stroller seat and which will extend under the seat panel of a stroller to properly enclose the legs of an infant seated upon the panel.

A still further aim of the present invention is to provide a stroller attachment of the aforementioned character that is extremely simple and practical in construction, small and compact in structure, neat and attractive in appearance, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1:
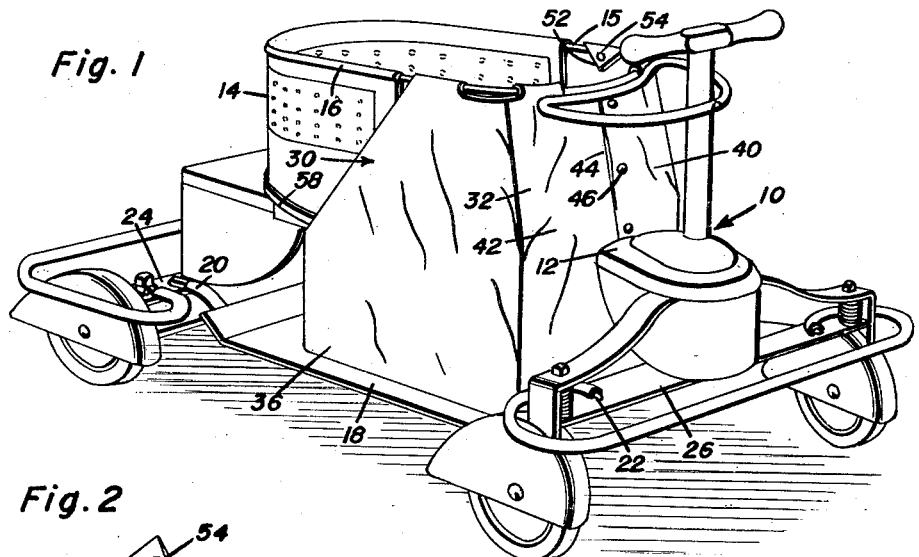
Figure 1 is a perspective view of a stroller and showing the present invention attached thereto.

Referring now to the drawings in detail, wherein for the purpose of illustration, there is disclosed a preferred embodiment of the present invention, the numeral 10 represents a stroller having the usual horizontal seat panel 12 whose rear end supports a forwardly extending arcuate back rest 14. The forward portion of the back rest 14 carries an arcuate forward rail 15 whose rear ends are secured in a beading 16 at the upper end of a back rest. A foot platform 18 is provided with forward and rear supporting arms 20 and 22 that rest upon the forward and rear wheel holding cross-frame members 24 and 26 of the stroller and retain the foot platform under the seat panel.

The present invention does not attempt to claim the above described conventional structure, nor is the invention restricted to the specific type stroller illustrated. Rather, the invention comprises an attachment for the stroller that will shield a child's legs against wind, rain and the like, while preventing the child from dragging his feet.

Figure 2:
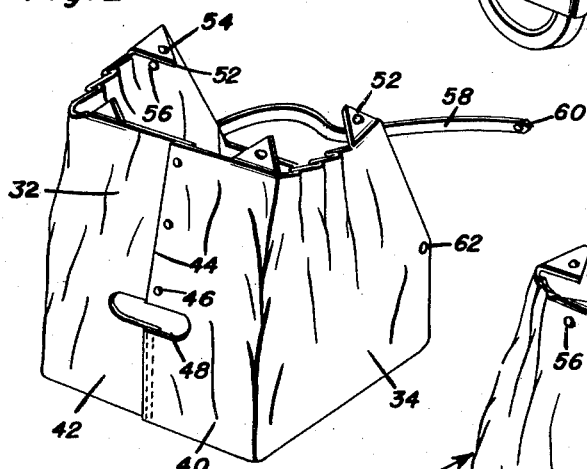
Figure 2 is a perspective view from the front of the present attachment.
Figure 3:
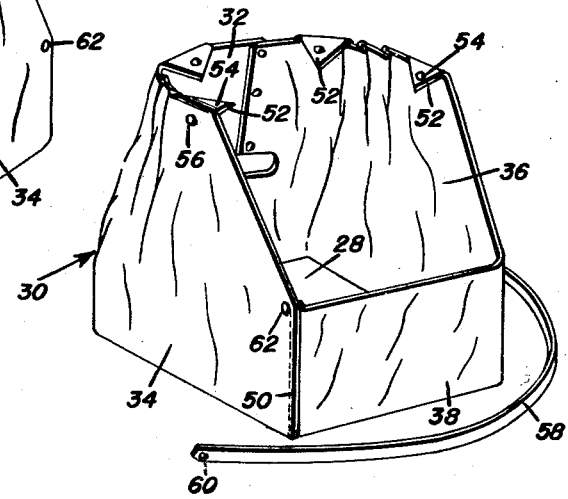
Figure 3 is a perspective view taken from the rear of the present attachment removed from the stroller.

The shielding attachment shown per se in Figures 2 and 3, comprises a substantially rectangular and flat bottom wall 28 of suitable material that will rest upon the upper face of the platform 18 under the seat panel 12. A flexible peripheral wall 30 is suitably attached at its lower end to the bottom wall 28, by stitching, cement or the like, or the peripheral wall may be integrally formed with the bottom wall.

The peripheral wall 30 includes a forward panel 32, a pair of side panels 34 and 36 and a relatively low rear panel 38. The forward panel 32 is divided into two sections 40 and 42 having overlapping inner vertical edges 44 that are connected by complemental snap fasteners 46 attached to these edges. The forward panel 32 is provided with a horizontal slot 48 for receiving the forward end of the seat panel 12.

The panels 34 and 36 are integral with the sections 40 and 42, respectively. One end of the rear panel 38 is integral with the rear edge of side panel 36 whereas the other end of panel 38 is attached to the rear end of the side panel 34 by stitching 50.

Flexible tongues or tabs 52 are formed at the upper ends of sections 40 and 42, and the side panels 34 and 36. These tongues are adapted to engage over the guard rail 15 and carry snap fasteners 54 for engaging complemental snap fasteners 56 at the upper ends of the side panels and the forward panel sections to retain the tongues engaged over the guard rail.

One end of a strap 58 is attached by stitching or the like to one side panel, for example panel 36, and the other end of the strap 58 is removably secured to the other side panel by complemental snap fasteners 60 and 62, one being carried by the free end of the strap and the other being secured to panel 34.

In practical use of the present invention, the edges 44 are separated by unsnapping the complemental fasteners 46 so that the attachment may be placed upon the platform 18 with the forward end of the seat panel 12 positioned in the slot 48. Then, the fasteners 46 are engaged and the tongues 52 are placed over the guard rail 15 and fasteners 54 are engaged with fasteners 56 to retain the walls 34, 36, 32 extended. Next, the strap 58 is extended about the back rest 14 and fasteners 60 engage with fasteners 62 to hold the peripheral wall against forward movement.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. For use with a stroller having a guard rail and a foot platform, an attachment for shielding a child using the stroller and also preventing a child using the stroller from dragging his feet, said attachment comprising a bottom wall adapted to rest upon the foot platform, a peripheral wall extending upwardly from the bottom wall and having opposite sides, means at the upper end of said peripheral wall for attachment to the guard rail, and a seat embracing strap carried by the peripheral wall and having its ends attached to said sides.

2. In a stroller including an elongated seat panel having forward and rear ends, a foot platform under the seat panel, an arcuate back rest attached to the rear end of the seat panel and a U-shaped guard rail attached to and extending forwardly from the back rest; a shield attachment for the stroller comprising a bottom wall resting upon the foot platform, a peripheral wall attached to and extending upwardly from the bottom wall, said peripheral wall including a forward panel, a rear panel and a pair of side panels joining said forward and rear panels, said rear panel being relatively low and terminating under the seat panel, said forward panel having two separable sections with overlapping inner vertical edges, complemental fasteners joining said overlapping edges, said forward panel also having a slot accommodating the forward end of the seat panel, a strap carried by the peripheral wall embracing the back rest, and means carried by the peripheral wall engaging the guard rail to retain the panels extended.

3. In a stroller including an elongated seat panel having forward and rear ends, a foot platform under the seat panel, an arcuate back rest attached to the rear end of the seat panel and a U-shaped guard rail attached to and extending forwardly from the back rest; a shield attachment for the stroller comprising a bottom wall resting upon the foot platform, a peripheral wall attached to and extending upwardly from the bottom wall, said peripheral wall including a forward panel, a rear panel and a pair of side panels joining said forward and rear panels, said rear panel being relatively low and terminating under the seat panel, said forward panel having two separable sections with overlapping inner vertical edges, complemental fasteners joining said overlapping edges, said forward panel also having a slot accommodating the forward end of the seat panel, a strap carried by the peripheral wall embracing the back rest, flexible tongues at the upper ends of said side and forward panels engaged over the guard rail, and complemental fasteners connecting the tongues to the forward and side panels.

4. A stroller attachment comprising a flat bottom wall, a peripheral wall extending upwardly from and attached to said flat bottom wall, said peripheral wall including relatively high forward and side panels and a relatively low rear panel that is connected to the forward panel by the side panels, said forward panel being composed of two sections having overlapping inner vertical edges, complemental fasteners joining said edges, said forward panel also having a vertical slot therein adapted to receive a seat panel, a back rest embracing strap carried by the peripheral wall and having one end permanently attached to the peripheral wall and the other end removably attached to the peripheral wall, flexible tongues at the upper ends of said side and forward panels engageable over a guard rail, said tongues having free ends, and complemental fasteners carried by said forward and side panels and said free ends removably attaching the free ends to the forward and side panels.

5. For use with a stroller having a guard rail and a foot platform, an attachment for shielding a child using the stroller and also preventing a child using the stroller from dragging its feet, said attachment comprising a bottom wall adapted to rest upon the foot platform, a peripheral wall extending upwardly from the bottom wall, and means at the upper end of said peripheral wall for attachment to the guard rail, said peripheral wall including a relatively low rear panel adapted to extend under the seat panel of the stroller.

6. For use with a stroller having a guard rail and a foot platform, an attachment for shielding a child using the stroller and also preventing a child using the stroller from dragging its feet, said attachment comprising a bottom wall adapted to rest upon the foot platform, a peripheral wall extending upwardly from the bottom wall, and means at the upper end of said peripheral wall for attachment to the guard rail, said peripheral wall including a forward panel composed of two sections, having overlapping inner vertical edges, complemental fasteners removably connecting said inner vertical edges, said forward panel having a slot therein adapted to receive the forward end of a seat panel.

References Cited in the file of this patent

UNITED STATES PATENTS

| Number | Name | Date |
| --- | --- | --- |
| 904,542 | Ledig | Nov. 24, 1908 |
| 1,037,572 | Adams | Sept. 3, 1912 |
| 1,121,878 | Sherman | Dec. 22, 1914 |
| 1,704,346 | Schneider | Mar. 5, 1929 |
| 1,793,848 | Gill et al. | Feb. 24, 1931 |
| 2,606,593 | Beurskens | Aug. 12, 1952 |